Aug. 25, 1925.　　　　　　　　　　　　　　　　　　　1,550,906
O. A. KNOPP
INSTRUMENT TRANSFORMER
Filed May 1, 1922　　　2 Sheets-Sheet 1
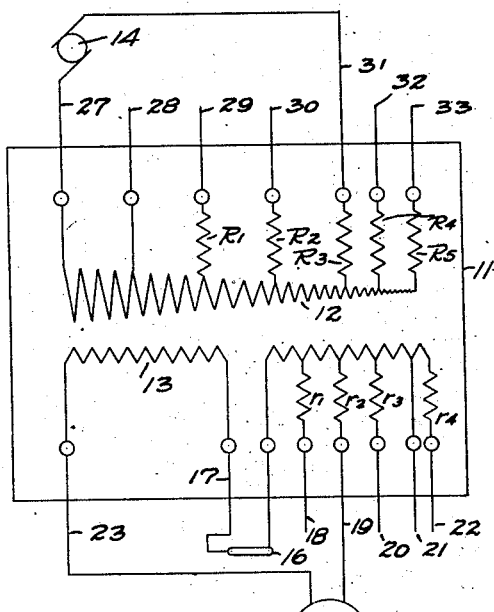
FIG. 1.
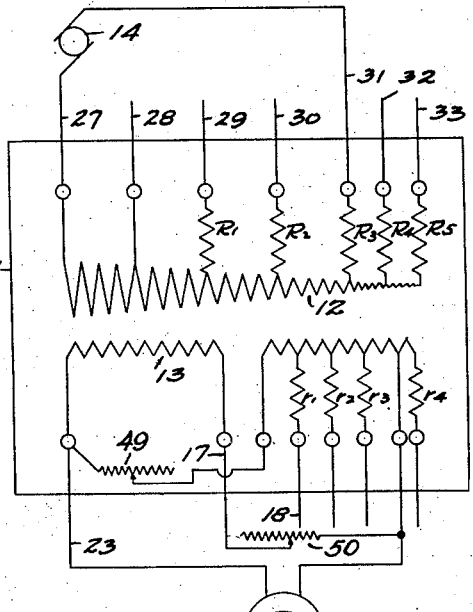
FIG. 2.
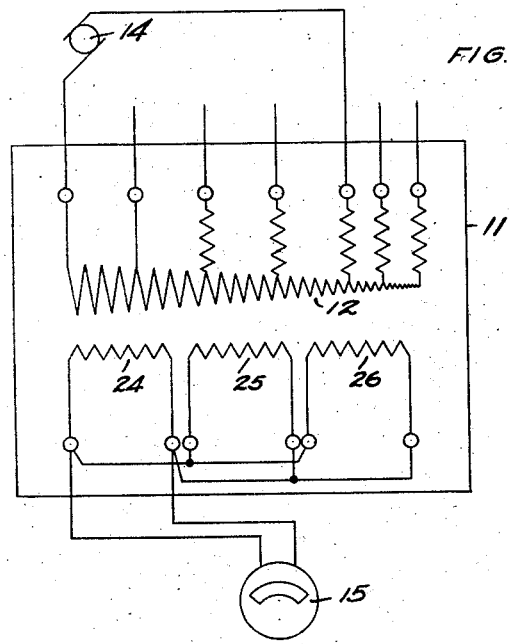
FIG. 3.
FIG. 4.
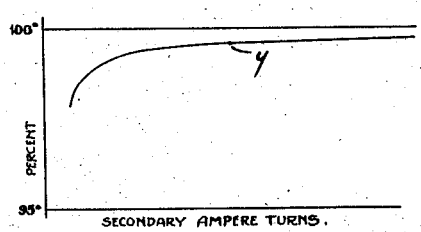
INVENTOR.
OTTO A. KNOPP.
BY White Prost Evans
his ATTORNEYS.

Aug. 25, 1925.

O. A. KNOPP 1,550,906

INSTRUMENT TRANSFORMER

Filed May 1, 1922

WITNESS:
H. Sherburne

INVENTOR.
OTTO A. KNOPP
BY White Prost Evans
his ATTORNEYS.

Patented Aug. 25, 1925.

1,550,906

UNITED STATES PATENT OFFICE.

OTTO A. KNOPP, OF OAKLAND, CALIFORNIA.

INSTRUMENT TRANSFORMER.

Application filed May 1, 1922. Serial No. 557,800.

*To all whom it may concern:*

Be it known that I, OTTO A. KNOPP, a citizen of the United States, and a resident of the city of Oakland, in the county of Alameda and State of California, have invented a new and useful Instrument Transformer, of which the following is a specification.

This invention relates to a transformer and its manner of calibration, for use in connection with electrical instruments, such as ammeters, voltmeters, or wattmeters, and more particularly to the provision of such a transformer in which several ratios of transformation may be used to permit a mutiplicity of ranges in the quantity of the electrical characteristic to be measured. The invention has particular utility in connection with the use of such a transformer with standard instruments to calibrate ordinary commercial instruments. A high degree of accuracy is of course desirable. This accuracy is necessary also when other instrument transformers are calibrated from this transformer.

Instrument transformers are usually supplied with calibration curves, showing the variation from the theoretically correct value of the ratio of transformation as the primary or secondary current is changed. The error in transformation is unavoidable, and is due to the internal resistance and to the exciting current of the transformer. In instrument transformers, which are used for measuring, it is of especial importance to know just how great the percentage of error is for each load. The calibration curves may be plotted to show the variation from 100% accuracy of the transformer ratio as the current through either winding varies. Such transformers are ordinarily so built that is necessary to supply a separate and distinct calibrating curve for each ratio of transformation. It is one of the objects of the invention to arrange matters in such a way that but a single calibration curve is needed for all ratios of transformation. It is a further object of the invention to make it possible to reduce the error of transformation due to the iron losses.

My invention possesses other advantageous features, some of which, with the foregoing, will be set forth at length in the following specification where I shall outline in full those forms of the invention which I have selected for illustration in the drawings accompanying and forming part of my present specification. In the drawings I have shown several embodiments of my invention, but it is to be understood that I do not limit myself to those forms, since the invention as expressed in the claims may be embodied in other forms as well.

Referring to the drawings:

Figure 1 is a wiring diagram of one form of my invention;

Fig. 2 is a wiring diagram of a modified form;

Fig. 3 is a wiring diagram of a further modification;

Fig. 4 is a calibration curve for a current transformer plotted in such a way as to take advantage of my invention;

Figure 5:
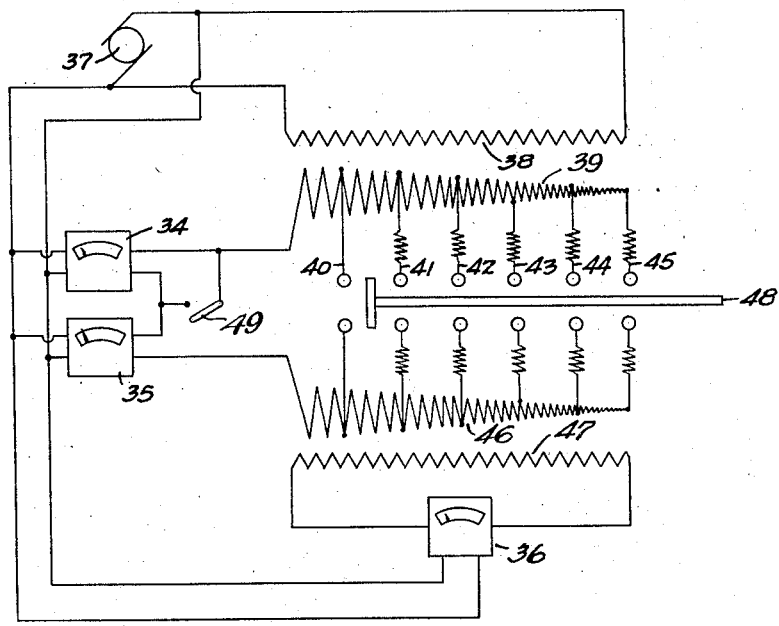
Fig. 5 is a wiring diagram illustrating the use of my invention in connection with the calibration of wattmeters or watthourmeters.

In Fig. 1 the instrument transformer 11 consists of a primary winding 12 and a secondary winding 13. The primary winding is connected so that its turns are energized in accordance with the electrical quantity to be measured; in the present instance, it is shown as connected to a generator 14, for measuring either the current flow therethrough or its potential difference. The secondary 13 is connected to a measuring instrument 15, here shown as of the indicating type.

In a current transformer, the current flowing through the active primary turns is substantially in the same ratio to the current flowing through the active secondary turns as the number of secondary turns is to the number of primary turns. It is the variation from the exact value of this ratio which it is necessary to ascertain and plot. Considering first the case where the transformer is used to reduce the flow of current so that it may be readily measured, I find it necessary to plot only a single calibration curve irrespective of the variation in the secondary turns to produce a varying ratio of transformation. This is one of the important features of my invention, and is due in part to the choice of coordinates for the calibration curve. I make the abscissæ proportional to the secondary ampere turns, and the ordinates proportional to the percentage which the number of secondary ampere turns is to the theoretically correct value. Such a curve is shown in Fig. 4. In this way it is possible to tell immediately whether the indication is under or over the required amount.

In current transformers the registration is ordinarily under value, due to the fact that a part of the primary current is used up for an exciting component, which has no counterpart in the secondary current. The aim of the arrangement is to make the value of $y$ on the curve of Fig. 4 the same for the same value of secondary ampere-turns irrespective of the number of secondary turns; in other words, irrespective of the values of the individual factors of the product of amperes and turns. Since actually it is the ratio of the secondary ampere turns to the primary ampere turns which is denoted by the value $y$, the former statement means that for a given value of the secondary ampere turns, the primary ampere turns must stay constant.

Figure 6:
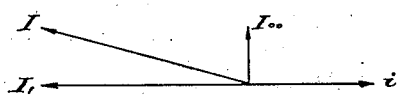
Fig. 6 is a vector diagram useful for explaining my invention.

If $n$ represents the number of secondary turns, $i$ the secondary current, N the primary turns and I the primary current, the value $y$ will represent $\frac{ni}{NI}$. It is this value which must be maintained constant, independent of the variations in the secondary turns $n$ or primary turns N. Referring now to the vector diagram of Fig. 6, the primary current I is represented as having two components, $I_1$ and $I_{00}$. The first part, $I_1$, is the part that serves to balance the secondary ampere turns when it flows through the primary windings. The second part, $I_{00}$ is the exciting component, and is that current necessary to supply the exciting ampere turns, so that the proper magnetic flux in the transformer core may be produced. The vector representing this current makes substantially a right angle with $I_1$, and this is the case where the secondary current flows through a circuit having negligible self-induction, and if the core losses are also negligible. It is thus possible to write the following identity:

$$\frac{ni}{NI} = \frac{ni}{N\sqrt{I_1^2 + I_{00}^2}} \quad (1)$$

The next step is to find expressions for $I_1$ and $I_{00}$ in terms of $i$, the secondary current. We know that $I_1 =$ $$I_1 = \frac{ni}{N},$$

since it is this component of the primary current that is used to balance the secondary ampere turns. This gives us our expression for $I_1$.

The exciting ampere turns is equal to $NI_{00}$, and is substantially proportional to the flux, and therefore to the volts $e$ per turn. That is, $$NI_{00} = Ke \quad (2)$$

If $r$ is the resistance of the secondary winding, and if this resistance comprises substantially all of the secondary impedance, then $$e = \frac{ir}{n} \quad (3)$$

Substituting this value of $e$ in (2) and solving for $I_{00}$, $$I_{00} = \frac{Kir}{nN} \quad (4)$$

Now, by substituting in equation (1) the values of $I_1$ and $I_{00}$ derived, and by reducing this equation becomes $$\frac{ni}{NI} = \frac{n}{\sqrt{n^2 + \frac{K^2 r^2}{n^2}}} \quad (5)$$

It is my aim to choose $r$, the resistance of the secondary winding, in such a way that the second member of equation (5) will be independent of $n$ entirely. This can be effected by making $r$ proportional to $n^2$, since in that case, all the $n$'s cancel out. The second member is also independent of N, the primary turns, and therefore it remains a constant, no matter how N or $n$ are varied, so long as the currents are reciprocally varied. In other words, for a given value of secondary ampere turns, there corresponds but one value of primary ampere turns, and these values may be used as coordinates of a curve, such as that shown in Fig. 4.

In the wiring diagram of Fig. 1, I have represented several taps both from the primary winding 12 and from the secondary winding 13. This secondary winding is shown as made up of two sections, connected by a switch 16, and having taps 17, 18, 19, 20, 21 and 22. It may be advantageous to wind the secondary sections at once by making a bifilar coil. Resistances $r_1$, $r_2$, $r_3$ and $r_4$ are shown in certain of the taps in order that the resistance of the winding from the terminal 23 to any of the taps, with the exception of tap 21, will be directly proportional to the square of the number of turns. These resistances may, of course, represent the internal resistance of the windings, if the cross section of the wire between the taps be properly chosen to satisfy the relationship between number of turns and resistance. As a practical matter, the resistance from the end terminal 23 to the first tap 17 is made the basis for the calculation of the resistances which the winding must have between this terminal and any of the other taps. If, for example, the number of turns between 23 and 17 is $t$, and the resistance between them is $q$, the following proportion must hold for the winding between 23 and any other tap, where the number of turns is $t'$ and the resistance between taps is $q'$:

$$\frac{q}{t^2} = \frac{q'}{t'^2}$$

or, $$q' = \frac{t'^2}{t^2} \times q \quad (6)$$

From this formula the necessary resistances of the winding sections may be easily calculated.

The winding section from 23 to 17 is made just one turn more than the section from 17 to 21. When these sections are connected in parallel, as shown in Fig. 2, the combined effect of both sections is as if they had been underwound by one-half of a turn. It has been customary heretofore to underwind the secondary to compensate for the error due to the core loss, but it has been heretofore impracticable to secure the effect of underwinding by a fraction of a turn. Such underwinding is especially important where high grade iron stampings are used in the cores, as is now quite common. It is entirely feasible to obtain any fraction of a turn underwinding, by utilizing a sufficient number of winding sections in parallel. Thus in Fig. 3 there are three sections 24, 25 and 26 is parallel, in which either one or two may have one turn less than the theoretically correct amount. This arrangement provides for an effect of underwinding by either one third or two-thirds of a turn. When the sections are connected in parallel, the ratio of transformation cannot be changed by changing secondary taps, so that it is unnecessary to provide a resistance in tap 21. The ratio however may be changed by changing the primary winding taps.

It is of course not necessary to use more than two sections in parallel for the core loss compensation, since evidently it is possible to combine into one winding all those in which there are the same number of turns, and make the cross section of the resultant winding equal to the sum of the cross sections of the component windings. Thus there would be two windings in parallel as in Fig. 2, one winding having less turns than the other; and the resistances of these windings may be so proportioned relative to each other that the same effect may be produced as if there were the proper number of component windings in parallel in each of the windings. For varying the effect to any desired amount, variable resistances 49 and 50 may be inserted in the two parallel windings of Fig. 2. By properly proportioning these resistances the equivalent of any desired fractional turn compensation can be easily obtained.

In Fig. 1 the primary winding terminal 27 and taps 28, 29, 30, 31, 32 and 33 provide conveniently the variation in ratio. In the case of a transformer used merely in connection with an ammeter to measure current, it is not essential to make the resistances of the various sections obey the law given in expression (6). This is evident from a consideration of expression (5), in which it is seen that the primary resistance R does not enter. However, resistances $R_1$, $R_2$, $R_3$, $R_4$ and $R_5$ are shown in the taps since as will be demonstrated later, the proper choice of resistances in the primary side serves a useful function when used in connection with voltmeters, wattmeters or watthourmeters.

When using an instrument transformer in connection with an ammeter, the primary side has comparatively few turns, and the secondary side has comparatively many turns. In this way it is possible to reduce the current that flows through the measuring instrument, and thus to use the same instrument irrespective of the value of current flow. In the case of voltmeters the primary side has comparatively many turns and the secondary side comparatively few turns, in order to reduce the E. M. F. measured by the voltmeter. Aside from this difference, substantially the same scheme of connections may be used when E. M. F.'s are measured as those shown in Figs. 1, 2 and 3. The calibration curve of Fig. 4, however, does not apply, since in this case it is necessary to make the abscissæ represent either primary or secondary volts per turn. If the primary volts per turn is $e_1$, and the secondary bolts per turn is $e_2$, then the point $y$ may represent the ratio $\frac{e_2}{e_1}$. With the choice of resistances in the primary winding taps as explained heretofore, this ratio is substantially constant for any particular value of primary or secondary volts per turn irrespective of variations in the ratio of transformation. This may be made evident from the following considerations:

The ratio of secondary volts per turn to primary volts per turn is less than the theoretically correct value due to the resistance drop in the primary windings, which decreases the primary E. M. F. per turn that corresponds to the induced E. M. F. per turn. This reduction is equal to $\frac{IR}{N}$. If R is made proportional to the square of the number of turns, this becomes KIN. But IN, the primary ampere turns, varies in the same ratio as the volts per turn. Therefore, the ratio of secondary volts per turn to primary volts per turn is maintained constant irrespective of the number of turns in the primary winding.

Fig. 5 shows the application of the invention to the calibration of wattmeters or watthourmeters. In this case a standard instrument 34 is used, the current coil of which is in series with the current coil of the meter 35 under test. An auxiliary meter 36 is also used of comparatively low range. The potential coils of all three instruments are connected directly across a constant source 37. This source also supplies a primary winding 38 of a current transformer with energy, the secondary 39 of which is provided with taps and resistances 40, 41, 42, 43, 44 and 45 arranged in accordance with the law formulated heretofore. To this secondary are connected the current coils of instruments 34 and 35 in series, and the primary 46 of a transformer for supplying energy to the auxiliary instrument 36, through the secondary winding 47. The primary 46 has taps located opposite the taps on the secondary 45, and a manually operated switch 48 is arranged to vary the number of active turns in windings 39 and 46. In this scheme of calibration, the reading of meter 36 is maintained constant even if the current through the current coils of instruments 34 and 35 is varied, by means of the simultaneous variation of the turns in windings 39 and 46. Then from the transformation ratio of the transformer comprising coils 46 and 47, it is possible to determine just what the reading of instrument 35 should be, even after the standard instrument 34 is short-circuited by the switch 49. By properly choosing the taps on winding 46, it is in this way possible to calibrate a large number of sizes of instruments with just one standard 34, since after the first calibration point is secured with the aid of this standard, other points may be obtained by a simple calculation involving merely ratio of transformation. This method of calibration is described and claimed in a patent, numbered 1,372,821, granted to me March 29, 1921, and entitled Electric measuring and calibrating method.

In order that this method be kept accurate, it is essential that the phase relation between the E. M. F. applied to all three instruments and the current flowing through the series coils be maintained constant; in other words, the power factor must be maintained constant.

The provision of resistances proportioned so that in the transformer windings 39 and 46, the resistance between the terminal and any one of the taps is proportional to the square of the number of turns included, accomplishes this result. This may be easily demonstrated. The $I^2R$ loss in the circuit including the two windings 39 and 46 is a constant upon variation in the number of turns, since I varies inversely as the number of turns, while R varies directly as the square of the turns. There is thus no change in the supply circuit, which would affect the angular relation of the current flowing through the series coils of the instruments.

By providing the disconnecting device 16 between sections of the secondary having equal numbers of turns, it is possible to calibrate the transformer very readily with the aid merely of indicating ampere-meters of comparatively low capacity. The basis of the calibration is to find the error for values of primary or secondary ampere turns. An obvious way in which this can be accomplished is to send currents of varying values, for example through the primary winding, and then measuring the current through the entire secondary windings. Knowing the number of turns on each winding, it would be possible to plot the curve of Fig. 4. This method is impracticable, however, because it would necessitate the use of a large capacity instrument for the primary side.

Since the error is the same irrespective of the number of turns, so long as the ampere turns on the primary or secondary stay the same, it would be possible to calibrate the transformer by the aid of a calibrating winding of a comparatively large number of turns, which would serve as one winding, while the secondary winding of the transformer would serve as the other. This however is also objectionable, since an extra calibrating winding is needed.

By splitting up the secondary winding 13 into two parts as shown, this disadvantage is overcome, since one of the parts may serve as a calibrating winding. For example, the left hand half of winding 13, from terminals 23 to 17, may constitute a secondary, while the remainder to the right may constitute a primary. Since both sections have the same number of turns, theoretically a 1:1 ratio exists; but the error in the transformer makes the current flow in the secondary less than through the primary. The percentage decrease is the percentage error of the transformer for the ampere turns that flow through the right hand winding section, or the primary ampere turns. This method of calibration may be termed the 1:1 method and is described and claimed in my prior patent hereinbefore identified.

It may be well to point out how the proportioning of the resistances in the secondary winding makes for accuracy in the foregoing method of calibration. The number of ampere turns present in the left hand section of the secondary winding really takes the place of the entire secondary winding ampere-turns during the process of calibration, and therefore the I²R loss in this winding should be the same for the same ampere turns, as if the whole secondary winding were active. If the turns of this section is $t$, and $i$ the current, then $it$ is the ampere turns; if the entire secondary were active, the turns would be $2t$, therefore to keep the ampere turns the same, the current would then be $\frac{i}{2}$. If $r$ is the resistance of the left hand section, the I²R loss is $i^2 r$. The resistance of the whole secondary is, by the proportioning described hereinbefore, equal to $4r$, and the I²R loss would be $\left(\frac{i}{2}\right)^2 .4r$, or the same as when the right hand section alone is used as a secondary.

Although the 1:1 method is described, the same scheme may be used even if the secondary winding is split up into more than two equal parts; for in this case, the I²R losses come out correctly provided the resistances are made to vary as the square of the number of the active turns.

I claim:

1. In an instrument transformer, windings, means for varying the number of active turns in one of said windings, and means for causing the resistance of the active portion of the winding to vary as a power higher than the first power of the number of active turns.

2. An instrument transformer having windings, and taps for one of the windings for varying the number of active turns in the winding, characterized by the fact that the resistance of the active portion as the number of turns is varied, is so arranged as to be proportional to the square of the number of active turns.

3. In an instrument transformer, windings, means for varying the number of active turns in one of said windings, and means for causing the resistance of the active portion of the winding to vary as the square of the number of active turns.

4. In an instrument transformer, primary and secondary windings, means for varying the number of active turns in said windings, and means for causing the resistances of the active turns in the windings to be proportional to the square of the number of active turns.

5. In an instrument transformer, a plurality of secondary windings connected in parallel, at least one of said windings having less turns than the others.

6. In an instrument transformer, a pair of secondary windings connected in parallel, the number of turns in one winding being less than that in the other.

7. The method of calibrating a current transformer which consists in plotting, for one ratio of transformation, the ratio of primary to secondary ampere turns as one of these two latter values vary, and so arranging the resistances of the active portions of the winding that the ratio of primary to secondary ampere turns remain substantially constant irrespective of variations in the number of turns.

8. An instrument transformer for varying the range of electrical measuring instruments, comprising a pair of inductively associated windings one of said windings having a comparatively large number of turns, and formed of a plurality of coil sections, and means whereby one of said sections may be used as a calibrating winding, at least some of the other sections being adapted to serve as a winding inductively coupled to said section during calibration.

9. In a current transformer, a plurality of secondary windings having equal numbers of turns, and adapted to be connected in series, the resistances of the sections being so proportioned that the resistance of any number of sections in series is proportional to the square of the number of turns in all of the sections.

10. In an instrument transformer, a pair of secondary windings connected in parallel, one of said windings having less turns than the other, and variable resistances in series with each winding.

11. In a current instrument transformer, a plurality of secondary windings having substantially equal numbers of turns, and adapted to be connected in series, means whereby one of said sections may be used as a calibrating winding, and whereby at least some of the other sections may serve as a winding inductively coupled to said section to form its secondary during calibration, and means fixing the resistance of this secondary portion at such a value that it bears the same ratio to the resistance of all of the sections in series, as the square of the number of its turns bears to the square of the number of turns in all of the sections in series, whereby substantially the same energy loss exists in this secondary portion for the same primary ampere turn excitation as if the entire secondary were active.

In testimony whereof, I have hereunto set my hand.

OTTO A. KNOPP.